(12) United States Patent
Kumar et al.

(10) Patent No.: US 7,826,907 B2
(45) Date of Patent: Nov. 2, 2010

(54) FORTUITOUS COMBINATIONS OF AD-HOC AVAILABLE SETS OF DIFFERENT ELECTRONIC DEVICES TO RESPOND TO USER JOBS

(75) Inventors: Rajnish Kumar, Atlanta, GA (US); Vahe Poladian, Pittsburgh, PA (US); Ira Greenberg, Sunnyvale, CA (US); Alan Messer, Los Gatos, CA (US); Dejan S. Milojicic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1827 days.

(21) Appl. No.: 10/632,403

(22) Filed: Jul. 31, 2003

(65) Prior Publication Data

US 2005/0027659 A1    Feb. 3, 2005

(51) Int. Cl.
   *G05B 13/02* (2006.01)
   *G06F 15/16* (2006.01)
(52) U.S. Cl. .......................... 700/28; 709/203
(58) Field of Classification Search ................. 709/201, 709/227, 203; 700/28
   See application file for complete search history.

(56) References Cited

U.S. PATENT DOCUMENTS

| | | | |
|---|---|---|---|
| 5,487,168 A * | 1/1996 | Geiner et al. .................. 705/8 |
| 6,198,479 B1 * | 3/2001 | Humpleman et al. ......... 715/733 |
| 6,326,536 B1 * | 12/2001 | Wang ......................... 84/477 R |
| 6,581,094 B1 * | 6/2003 | Gao ............................ 709/220 |
| 6,792,323 B2 * | 9/2004 | Krzyzanowski et al. ....... 700/90 |
| 6,982,962 B1 * | 1/2006 | Lunsford et al. ............. 370/278 |
| 7,035,871 B2 * | 4/2006 | Hunt et al. ................ 707/104.1 |
| 2002/0089687 A1 * | 7/2002 | Ferlitsch et al. ............ 358/1.15 |
| 2003/0051240 A1 * | 3/2003 | Schaffer et al. ............... 725/34 |
| 2003/0229900 A1 * | 12/2003 | Reisman ....................... 725/87 |
| 2003/0234737 A1 * | 12/2003 | Nelson et al. ............... 341/176 |
| 2007/0179791 A1 * | 8/2007 | Ramesh et al. ................. 705/1 |

OTHER PUBLICATIONS

Rajnish et a., User centric appliance aggregation, 2002, available at: http://www.hpl.hp.com/techreports/2002/HPL-2002-277.pdf.*
Enhanced service discovery in bluetooth, sasikanth Avancha.*

* cited by examiner

*Primary Examiner*—Kamal B Divecha

(57) ABSTRACT

A computer-implemented method for selecting a combination of devices from a plurality of available devices, each device having service description information associated therewith. A user request is received into a coordinating device which processes the service description information for any available electronic devices to identify functionally responsive combinations of electronic devices, each functionally responsive combination responsive the user request. A score is calculated for each functionally responsive combination, using user preference information. One of the functionally responsive combinations is selected according to it having the best scores. A user preferences and experience computer-implemented method is provided for selecting an ad-hoc combination of electronic devices.

14 Claims, 4 Drawing Sheets

FORTUITOUS COMBINATIONS OF AD-HOC AVAILABLE SETS OF DIFFERENT ELECTRONIC DEVICES TO RESPOND TO USER JOBS

FIELD OF THE INVENTION

The present invention relates to a method and system for combining plural available electronic devices to perform a user request. In a typical application, the invention may be used to automatically combine device functionality in a user preferences and experience way.

BACKGROUND OF THE INVENTION

It is increasingly common for a user to own multiple electronic devices; such as a laptop, a PDA, a digital camera, and a smart phone. Moreover, a user will often encounter environments in which they are able to access electronic devices which they may not own, but which are nevertheless available for them to use, such as a desktop computer, speakers, a room projector, and a keyboard. These electronic devices may be available in, for example, an office, and in public places such as airport kiosks and coffee shops.

Individually, these electronic devices may offer a specialized set of functional capabilities. Combined together, however, the electronic devices may offer much greater functionality and in this form may significantly enhance a user's experience.

Indeed, as electronic devices become increasingly affordable and as wireless infrastructure becomes pervasive, the potential to combine, or aggregate, the functionality of electronic devices to provide users with a better experience grows.

Even a few devices can be combined in many ways to perform a particular task. So, it may not be obvious how to select an optimal combination of electronic devices from a range of functionally responsive combinations which are able to perform a given user request. In some circumstances, a user must choose among the functionally responsive combinations without having access to essential information such as the characteristics of the electronic devices which are available to the user. This problem is exacerbated in environments where the available electronic devices are unfamiliar. Accordingly, it would be an advantage if a method and system for combining the functionality of devices to achieve a user's desired experience was available.

There have been prior art attempts to provide a richer experience to a user in the presence of multiple electronic devices. Such designs have typically represented devices as services, and then applied service composition techniques. Previous attempts have focused on resource requirements and conflicts, and have not accounted for user preferences and experience.

SUMMARY OF THE INVENTION

An object of the present invention is to provide a computer-implemented method which selects a combination of electronic devices in accordance with the preferences of a user.

Another object of the invention is to provide a computer system which is able to perform the inventive method.

Another object of the invention is to provide a computer data storage media having programmed thereon computer software instructions to make a programmable device execute the inventive method.

In brief, the invention provides a computer-implemented method for selecting a combination of devices from a plurality of available devices, each device having service description information associated therewith. A user request is input into a coordinating device that processes the service description information for the available electronic devices to identify functionally responsive combinations of electronic devices, each functionally responsive combination responsive the user request. A score is calculated for each functionally responsive combination, using user preference information. One of the functionally responsive combinations is selected according to the scores.

An advantage of the invention is that it provides a user preferences and experience computer-implemented method for selecting a combination of electronic devices in an ad-hoc environment.

Another advantage of the invention is that it provides a computer-implemented method which enables a user to have a richer experience when using the devices without having knowledge of the characteristics of the devices.

These and other objects of the present invention will no doubt become obvious to those of ordinary skill in the art after having read the following detailed description of the embodiments illustrated herein.

DETAILED DESCRIPTION OF THE EMBODIMENTS

Embodiments of the invention automatically combine electronic devices that are fortuitously available to a user. One embodiment of the present invention provides an automatic combination of devices and for the user preferences and experience selection of an optimal combination. Indeed, the present invention allows the automatic combining of devices, to allow the selection of the combination that best matches a user's preference.

To allow such automatic combination, the functionality provided by a device is viewed as a service, and a device is described in terms of the services that it can offer and the services it will need.

The services offered by a device, various attributes of the device, and parameters required for execution are described using service description information which is associated with the device. Each device the respective service description information is contained in a service description file. The service description file is in the form of a simple extensible mark-up language (XML) format.

The service description information includes information which describes the functionality offered by the device associated with the service description information. In a prototype implementation, the functionality of a device is represented using a directive in the form of a data-action pair. For example, a device that can play mpeg movies is described as being able to handle the "play, mpeg" directive pair. Further, for each directive supported, devices also describe their needs. By way of example, a device supporting a "play, mpeg" directive may need a sound device and a video device to function. Devices are of the same type if they support the same data-action directive.

The service description information also contains values of various attributes. Devices of the same type also have the same set of attributes. Further, in one embodiment of the present invention, the service description information also includes runtime invocation information, such as the handle of an executable file that needs to be run.

A system embodiment of the present invention is designed to provide an infrastructure for device functionality combination in a user preferences and experience way. In the following section an architecture of a preferred embodiment of a system according to the present invention is described.

Figure 1:
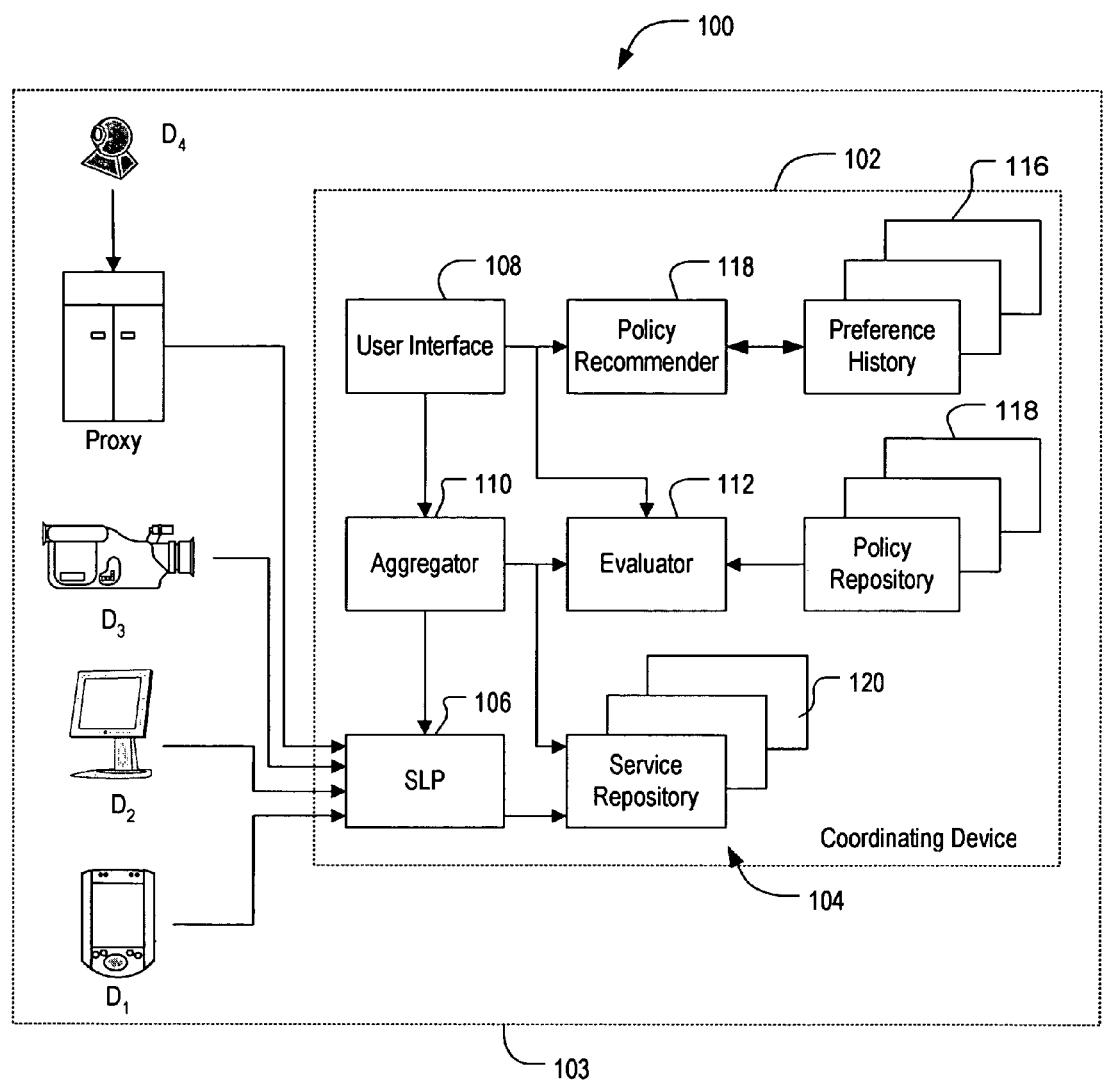
FIG. 1 is a block diagram of a system embodiment of the present invention.

Referring now to FIG. 1, a system 100 includes a coordinating device 102 responsible for running software modules 104 of the system 100. Any suitable device from a device ensemble 103 may be assigned to function as a coordinator device 102. A particularly suitable device includes a personal digital assistant (PDA) or a laptop computer. The run-time software modules 104 of the system 100 comprise a service registration and lookup (SLP) module 106, a user interface module 108, an aggregator module 110, an evaluator module 112 and a policy recommender module 114. As is shown in FIG. 1, in addition to the run-time modules, the system also includes configuration components, namely a user preference history 116, a policy repository 118 and a service repository 120.

The user interface module 108 provides a web-based interface for receiving user requests into the coordinating device 102. A user request may be specified in terms of a data-action pair directive. For example, to request that the system 100 play the movie "The Matrix", a user would enter the directive "play" and the data source "TheMatrix.mpeg" into the user interface module 108. The user interface module 108 may also be used to guide the system 100 in the selection of the optimal combination using preferences which are attributable to the user. However, as will be explained in more detail later, a user does not have to explicitly specify their preferences, as the system is capable of predicting a user's preferences based on the user's history.

The SLP module 106 is a run time module which acts as a central directory for the available devices to register their presence, location, functionality and attributes.

According to one embodiment of the present invention, devices from the ensemble 103 are able to register their functionality with the coordinator device 102 by posting service description information (in the form of a service description file) to a registration URL. In a prototype implementation, the service description information is an XML file that specifies the data-action directive that a service offered by a device can handle, and other information, including the other services that the services offered by the device requires, and additional information such as values or attributes that are appropriate for that service type. The following is an example of an XML service description file for a device which offers an MPEG splitting service:

```
<service name="MPEG Handler Splitter Application - Splits Sound
and Video Into Separate Streams" uniqueId="MPEGPlayerSplitter">
    <handles mime="mpeg" action="play"/>
    <virtualLocation>polian.hpl.hp.com</virtualLocation>
    <executableHandle>splitter.bat</executableHandle>
    <serviceReqParameters>mp3player=$serviceReq:mp3:
```

```
        input</serviceReqParameters>
    <serviceReqParameters>aviPlayer=$serviceReq:avi:
        input</serviceReqParameters>
    <requires>
        <serviceReq mime="mp3" action="play"/>
        <serviceReq mime="avi" action="play"/>
    </requires>
</service>
```

In the above example, the device is specified as a MPEG-PlayerSplitter which is able to handle a "mpeg.play" directive. The services which are required to support, and thus allow the MPEGPlayerSplitter to be utilized, have also been specified, namely, a mp3 player (that is, "mp3player") and an avi player (that is, "aviplayer"). Furthermore, the data-action directives for the required services have been identified as mp3.play and avi.play for the mp3 player and the avi player respectively.

In one embodiment, the system 100 runs an XSLT transformation on the service description file to generate registration information (in the form of an SLP registration string) for the SLP module 106. By way of example, the SLP registration string for the MPEG splitter of the earlier example is:

```
service:play.mpeg:MPEGPlayerSplitter://poladian.
hpl.hp.com/"(uniqueId=MPEGPlayerSplitter)"
```

The above example is a "service:" URL that conforms to an SLP standard. The data-action directive is included (that is, "play.mpg") in the SLP registration string to specify the data-action directive that the service (in this case, the MPEG handler splitter service) can handle.

The system 100, uses SLP registration strings to register services with the SLP module 106. In one embodiment service registration remains valid for a fixed duration (the expiry interval) after which interval the service registration expires. However, devices may reregister themselves with the SLP module 106 within the expiry interval to ensure that the information in the system 100 is up to date. In one embodiment, the length of the expiry interval is reconfigurable.

The aggregator 110 module of the coordinating device 102 comprises a rules based intelligent engine which is responsible for generating all of the functionally responsive combinations of devices from the ensemble 103 that can satisfy a user request. In one embodiment of the present invention, the core of the aggregator module 110 is a Java Expert Shell System (JESS), a rule-based engine written entirely in Java.

The evaluator module 112 takes as input the set of all functionally responsive combinations generated by the aggregator 110 and a set of appropriate policies and processes the input to compute scores for each of the functionally responsive combinations. In this way, the functionally responsive combinations may be ranked according to the preferences which are attributable to the user.

The policy recommendation module 114 provides support for predicting a user's preferred policies for devices, combination, and ensemble levels. This allows the system 100 to combine devices from the ensemble 103 even when the user chooses not to specify policies. In this respect, the policy recommendation module 114 selects policies that represent the user's preferences based on the choices that the user has made in the past (history), the task being requested, and other aspects of current context such as the time of day. In a prototype implementation, a decision tree algorithm is used to predict the policies.

User past preferences and contexts are stored in history files 116, and these files are used as the learning set by the decision tree algorithms. Context contains the factors that may influence user's choice of policies, e.g. user task, or location. The history files 116 are updated whenever the user provides their preferences manually. Hence, in the beginning the history files 116 may not be rich enough to help the decision tree algorithm to provide a consistent prediction. When the user's history is not rich enough to make a meaningful decision, default policies, that are pre-specified for each of the three policy levels, are used.

The service repository 120 contains the service description information for all the registered devices. The service description information is initially provided by the registering device, and then saved in the service repository 120. The service repository 120 is able to be accessed by the aggregator module 110, the evaluator module 112 and the SLP 106.

The policy repository 116 contains policies for scoring device attributes, devices and combinations. As described previously, the policies encode numerical weights, using preferences attributable to a user, for various attributes whether based on a user's input, or perhaps historical information for that user.

The system 100 may be implemented using any suitable programming language. However, one embodiment of the present invention is implemented in Java and runs within a Java servlet engine.

The user interface 108 of the system 100 is web-based and thus may be used from any suitable device within the ensemble 103. The system 100 itself is centralized. It is also discoverable, which makes the system 100 somewhat more flexible, particularly in an ad-hoc environment.

In a prototype implementation, the bulk of the system 100 software is composed of Java code, XML configuration files and a JESS template file. Upon initialization, the system 100 loads the JESS template file and initializes a JESS engine. It then loads the XML configuration files, and prepares to accept user requests.

The JESS template file contains definitions for fact templates and rules for expanding combinations. In a prototype implementation, templates are provided for the user requests, services, combinations, and final-combinations. All of the XML files are kept in a respective repository. These files include service descriptions, policies, and history.

Figure 2:
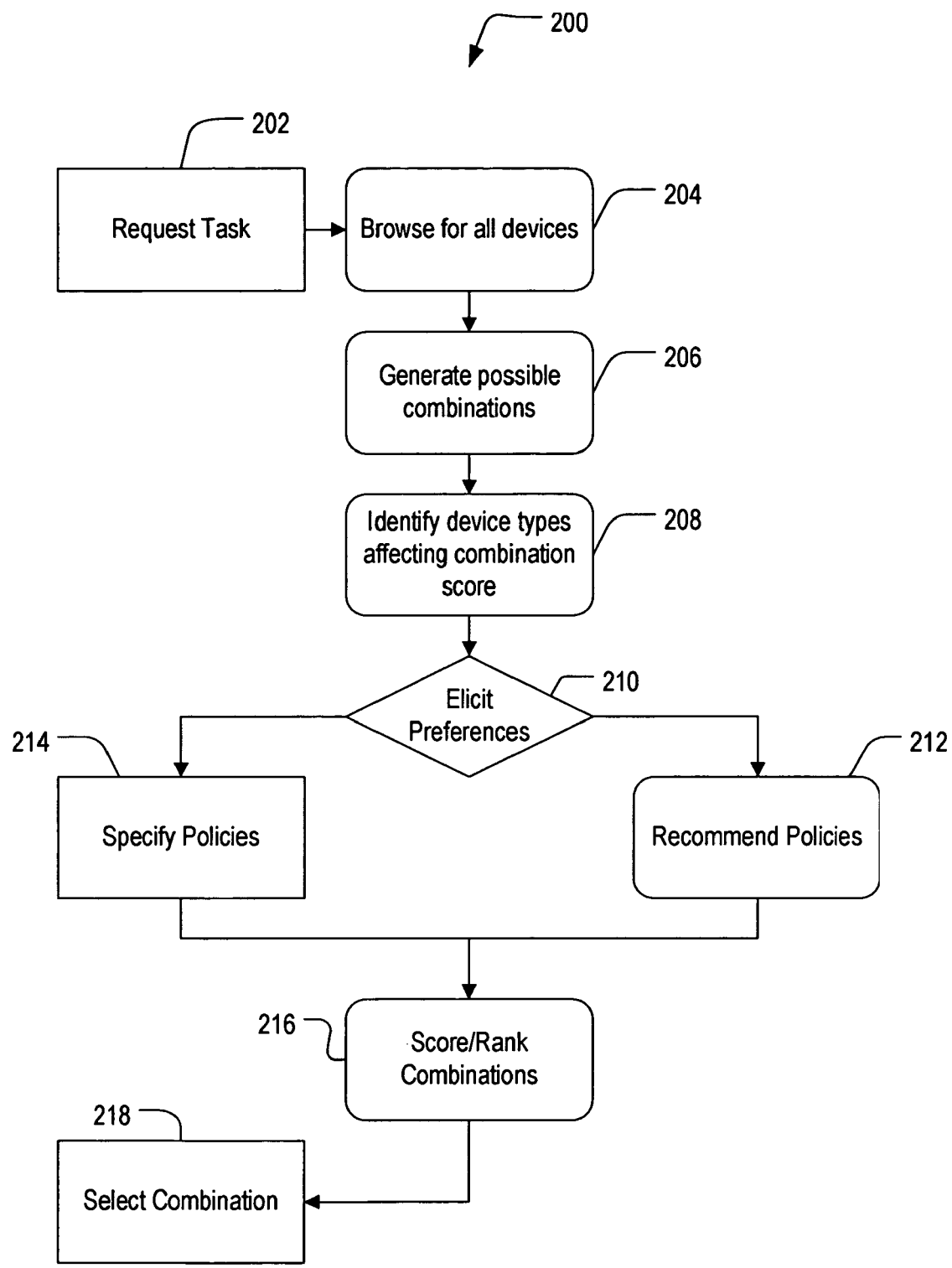
FIG. 2 is a flowchart diagram of an ad-hoc equipment combination-finding method embodiment of the present invention.

FIG. 2 represents a method embodiment of the present invention. Such method is referred to herein by the general reference numeral 200. The method 200 is preferably implementable using system 100. Accordingly, the method will be described with reference to the components of system 100.

Method 200 begins with a user request task step 202. A user requests a task by entering a data and action directive pair into the user interface 108 (FIG. 1). For example, a user request to play a movie may be specified using the action directive "play" together with the data source in the form of the movie title. Moreover, a user also may also enter other information which guides the selection of an optimal combination.

At step 204 all of the services in the SLP 106 (FIG. 1) are browsed to retrieve service description information for all of the services which are registered in the SLP 106.

Browsing of the registered services is done in two steps. Firstly, all of the service types which are registered with the SLP 106 are queried. These data-action directives come from service description files for the registered services. Secondly, all of the services are queried which are registered with the SLP 106 of a given service type. This approach enables all of the services registered with the SLP 106 to be browsed without relying on any prior information.

Once all of the service description information for the registered services has been retrieved, format transformations are performed to convert the retrieved registered service descriptions into JESS facts. Any suitable transformation scheme may be used, however, in a prototype implementation, extensible stylesheet language transformations (XSLT) are used.

Continuing with the earlier example, the JESS fact for the MPEG player splitter service is as follows:

```
(assert
    (service(serviceId MPEGPlayerSplitter)
    (handlesDirective play_mpeg)
    (final no)
    (requires (create play_mp3 play_avi))
    ))
```

The JESS facts are instantiations of a JESS template definition for a service object. In the above example, the JESS template definition is as follows:

```
(assert
(deftemplate service
    (slot serviceId)
    (slot handlesDirective)
    (slot final (default yes))
    (multislot requires (default (create$)) )
)
```

A template definition defines the name of the service type and the slots that the type has. The "requires" slot is a multi-slot, multiple values are able to be specified. For the above example, there are two services required: "play_mp3" and "play_avi".

In a step 206 all of the functionally responsive combinations of the devices that can satisfy the user request are generated by aggregator 10 (FIG. 1). More specifically, step 206 includes the automatic generation of the functionally responsive combinations using the JESS facts for each of the retrieved service descriptions. The generation of the functionally responsive combinations using the JESS facts includes entering each fact into the JESS engine and asserting a fact that corresponds to the user request.

When the JESS engine is executed, rules are fired based on matches among existing facts. When a rule is fired, new facts are generated. Initially, the fact corresponding to the user request is matched with an appropriate service, and partial combinations are generated.

Partial combinations are further expanded using facts that match the needs (that is, the services required) of the services in these combinations. Combination expansion stops when all of the needs are satisfied, or when there are no more matches.

So every combination, partial or complete, is stored in the JESS engine during the generation step 206. This makes it possible to later query all of the complete combinations. The design of the combination template also makes it possible to store information about the structure of the combination, including a dependency graph. This approach also supports several other features, including the "pinning" of devices where a user is able to specify the exact devices to use to perform some of the services.

The JESS engine stops when no more rules can be applied. At that point, a query is made for facts of type "final combinations". If none are found, then no feasible combination exists that satisfies the user request. Otherwise, a list of final combinations is generated. Thereafter, a step 208 identifies the device types which most affect the device-combination scores. The system identifies the devices types which have been included in the final combinations.

Once the device types have been identified, a step 210 asks the user to select a mechanism for choosing the policies which will be used to calculate a score for each of the final combinations. A user has two ways to select the policies, namely, the user may select the policies manually, or the user can request that the system automatically recommend the policies.

In the event that the user elects to have the system automatically recommend the policies, in a step 212 the system makes decisions by applying a decision-tree classifier using information retrieved from user preference history 116. In one embodiment of the present invention, the decision tree classifier comprises a collection of machine learned algorithms for solving real-world data mining problems. Although learning in one embodiment is based on a decision tree, other data mining approaches may be used with minor changes to the implementation.

The input to the decision tree includes data retrieved from the user's preference history 116 (FIG. 1). More specifically, the retrieved data comprises a data set file having entries for context information and the policies selected by the user in the past for that context. In a prototype implementation, the data set file is stored in a attribute-relation file (ARFF) format. The following provides an example of a ARFF file suitable for recommending a device-level policy (in this example, "Policy_Larger_Better" or "Policy_Private") for a "display_video" request:

```
@relation policyEngine
@attribute task {play_mpeg, play_avi, run_email}
@attribute time {morning, midday, evening, night}
@attribute policy
    {Policy_Larger_Better, Policy_Private}
@data
    play_mpeg, night, home, Policy_Private
    play_mpeg, midDay, office, Policy_Private
    play_mpeg, midDay, conferenceRoom, Policy_Larger_Better
```

In one embodiment of the present invention, a separate data set file exists for each policy level that requires a policy to be selected. For device-level policies, there is a data set file for each service type supported by the end devices (for example, display_video). Similarly, the system stores history information about combinations and ensemble-level policies in separate data set files.

The data-set files are updated when a user manually selects a policy. More specifically, when a user manually selects a policy, an entry comprising the context and the policy selected is added to the respective data set files for every non-default policy selected by the user.

Indeed, in the event that user elects to manually select specific policies then this is performed in a step 214. Any policies not specified by the user are filled in automatically.

Figure 3:
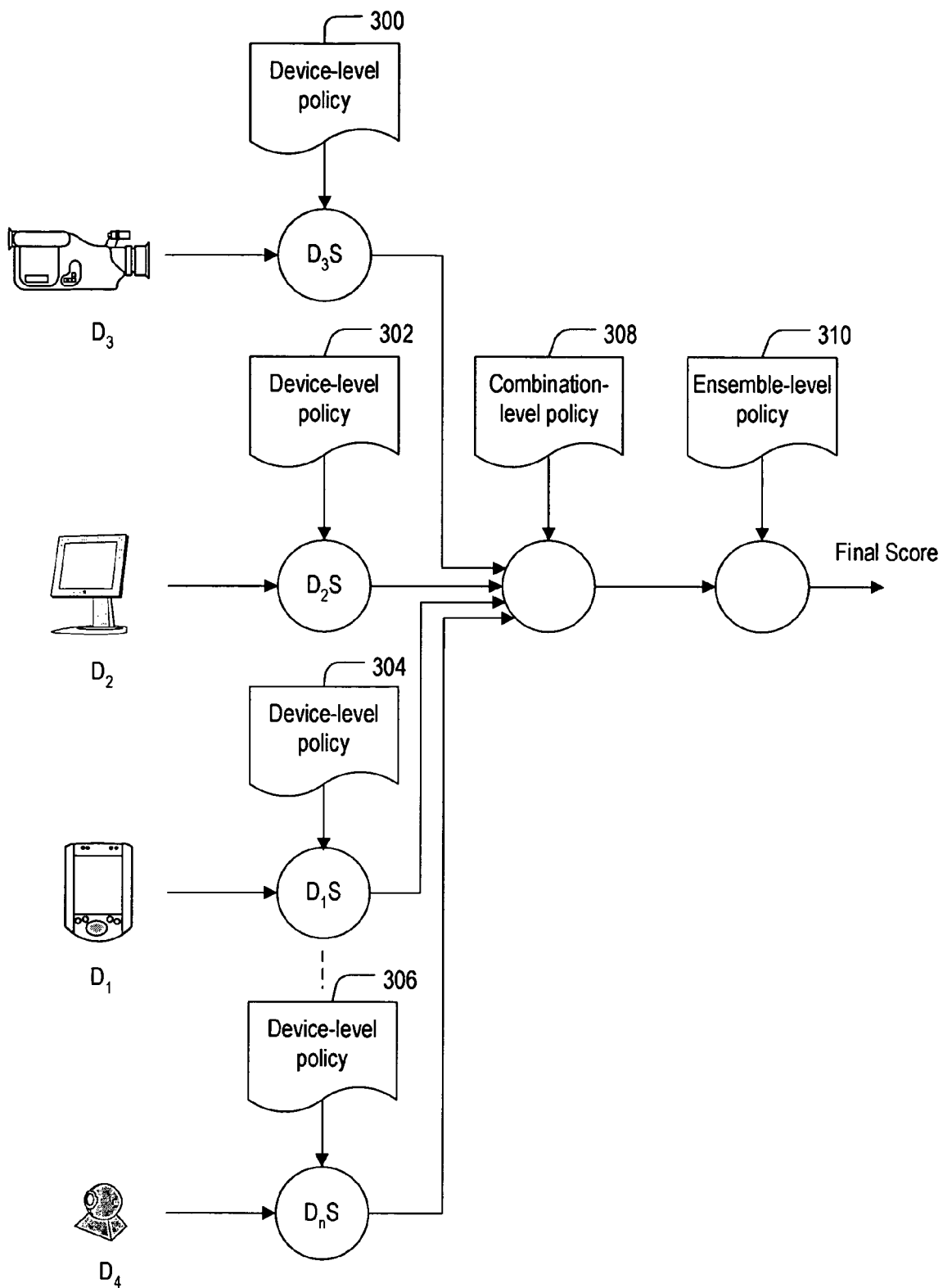
FIG. 3 a flowchart diagram of a scoring mechanism suitable for use in embodiments of the present invention.

Irrespective of whether the policies have been selected manually (by the user) or automatically (by the system), once the policies have been selected the selected policies are used to calculate a score for each of the final combinations. As is shown in FIG. 3, there are three policy levels which are used to calculate the scores:

a. device-level policies 300, 302, 304, 306 capture information about device attributes;
b. combination-level 308 policies capture information about how the devices are scored relative to each other; and
c. ensemble-level policies 310 capture less tangible information such as combination stability, user distraction, and multiple tasks.

Device-level policies 300, 302, 304, 306 allow a scoring of the devices $D_1$ to $D_4$, and compare two devices that can each provide the same type of service.

Figure 4:
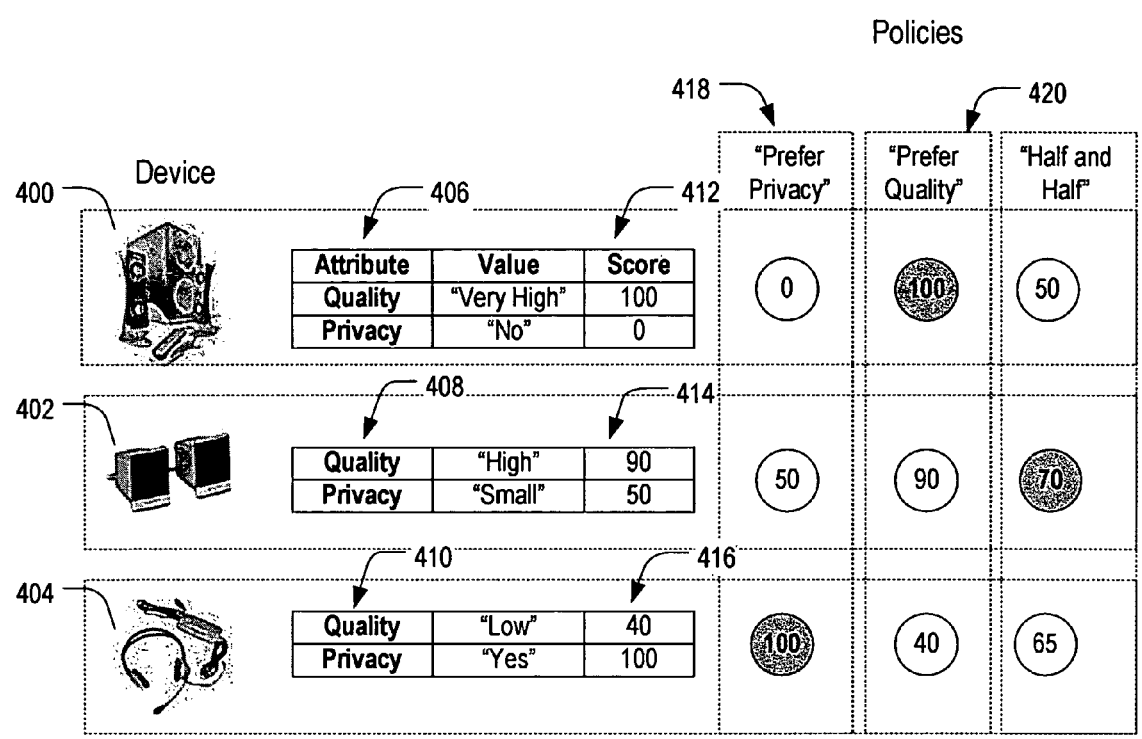
FIG. 4 is a diagram illustrating an application of the scoring mechanism of FIG. 3.

FIG. 4 is an example of scoring devices offering the same type of service. The devices here include a room speaker system 400, a desktop speaker system 402 and an earphone 404. For each type of device, a set of attributes 406, 408, 410 are used for scoring. In a prototype implementation for a speaker system, the attributes included quality of the sound output, and the privacy of the system.

Each attribute in the set of attributes 406, 408, 410 are assigned respective values 412, 414, 416. The attribute values are used to calculate a device score using a particular device-level policy. Each attribute value contributes differently to a device score depending upon the device-level policy used to calculate the device score. When a "Prefer Privacy" 418 device-level policy is applied, the attribute values which are used for the device score calculation are zero, fifty, and one-hundred for devices 402, 404, and 406 respectively. On the other hand, when a "Prefer Quality" 420 device-level policy is used, the attribute values for devices 402, 404 and 406 are 100, 90 and 40 respectively. The attribute values for each attribute are included in an XML file.

In another example, where the device to be scored is a video display, the attributes may be the size of the display; the "flatness" of the display; the mounting arrangements for the display; and privacy.

An example of a device scorer XML file for this simple example,

```
<serviceScorer action="display" mime="video">
<attributes>
    <attribute name="size"> <point value="xLarge" score="100"/>
        <point value="large" score="90"/>
        <point value="medium" score="80"/>
        <point value="small" score="30"/>
        <point value="verySmall" score="10"/>
    </attribute>
    <attribute name="flatScreen">
    <point value="yes" score="100"/>
    </attribute>
        <attribute name="wallMounted">
        <point value="yes" score="100"/>
        <point value="no" score="0"/>
    </attribute>
        <attribute name="private">
        <point value="yes" score="100"/>
        <point value="no" score="0"/>
    </attribute>
</attributes>
</serviceScorer>
```

A device-level policy is a vector of weights that are applied to the attribute scores of a particular device to obtain a single score for that device.

Different device-level policies allow different attributes to be afforded more weight than others. For example, a policy named "Large_Display" may be weighted to favor the size of the display, whereas another policy (for example, named "Private_Display") may be weighted to favor the privacy attribute. The following is an example of a device-level policy for a video display device type having the attributes of the previous example, and which favors the size attribute:

```
<serviceScoringPolicy
    name="Largest display, slight
    preference for flat screen"
    action="display" mime="video"
    id="Policy_Larger_Better">
    <attributes>
        <attribute name="size" weight=".9"/>
        <attribute name="flatScreen" weight=".1"/>
        <attribute name="wallMounted" weight=".0"/>
        <attribute name="private" weight=".0"/>
    </attributes>
</serviceScoringPolicy>
```

The weights which are assigned to the attributes: size, flat screen, wall mounted and private are 0.9, 0.1, 0.0 and 0.0 respectively. The size attribute has been accorded the most weight.

In one embodiment of the present invention, the score of a given device D, according to policy P, is computed using a function which uses the dot product of the vector weights specified by the policy with the vector of attribute scores for that device. However, it is envisaged that other functions may be suitable. Nevertheless, in a prototype implementation, the device score is computed as:

$$DS(D, DP) = \sum_{i=1}^{d} aw_i(DP) * D(v_i)$$

where:

DS is the device score for device D according to a device scoring policy DP;

d is the number of attributes for the device;

$aw_i(DP)$ is the weight of attribute i according to policy DP; and $D(v_i)$ is the device's value ($v_i$) for attribute i.

Combination-level policies are used to indicate that some devices are more important to the user than others when forming a combination for a particular user request in a particular user context. This is done by having the combination-level policies provide weights to the devices themselves, as opposed to the attributes of the devices. For example, when watching an action movie, a user may desire a very good display and may be much less interested in the sound quality. On the other hand, when watching a music album, the user may be more interested in the sound quality than the quality of the display. Similar to device level policies, combination level policies are described using high-level names so that the user does not have to deal with numbers. In a prototype implementation, several combination-level policies were provided with the system to accommodate different user requests.

A combination-level policy comprises a vector of weights that are applied to the individual device scores to obtain a single "quality score" for a functionally responsive combination.

The quality score is computed by applying a combination scoring function. A combination score may be computed using any suitable function. However, in a prototype implementation, the combination score is computed as:

$$AS(A, AP) = \sum_{i=1}^{n} sw_i(D, AP) * e(D_i) * DS_i(D, DP_i)$$

where:

A is the particular combination;

AP is the combination scoring policy;

AS is the combination score;

n is the number of devices that are included in the particular combination;

$sw_i$ is the weight assigned to the device of type i according to the combination policy AP;

$DS_i$ is the unweighted device score for device $D_i$; and $e(D_i)$ is a percentage indicating the availability of the device $D_i$.

As was the case with the device-level policies, combination-level policies are described using high-level names so that a user does not have to deal with numbers.

The term $e(D_i)$ accounts for stability (that is, the probability that a device will be available throughout the duration of the user task). The weight of this term reduces the contribution of a device score by some percentage that is equal to the probability of that device becoming unavailable. It is not essential that the quality score be calculated using a stability term. Nevertheless, it is preferred that a stability term be included so that the invention is able to account for possible user inconvenience when there is a change in devices that are participating in a combination. For example, if a device uses some resource (such as bandwidth) near its capacity, then it might be better to choose a different device so that unexpected variations do not necessitate re-combination. Similarly, if a device is expected to become unavailable before a task is completed, say because its lease will end, then it might be better to start with a different device.

An ensemble-wide policy is used to combine the quality scores and stability scores. An ensemble-wide score is computed for each of the functionally responsive combinations using a quality score and a stability metric. The stability metric is computed as the lowest availability value of any device in a respective aggregation.

In a prototype implementation, a history-based approach was used to gauge how frequently the devices have been available.

An ensemble-wide policy effectively specifies which quality or stability dimension should get more weight. By giving substantial weight to stability, the quality score for a combination is sacrificed for a more stable combination. If a device that is part of a running combination becomes unavailable, then it will be necessary to reconfigure the system, a potentially costly operation. Another measure in the ensemble-wide policy is the change penalty weight. This measure is only used during reconfiguration.

Indeed, minimizing a user's inconvenience may be an important factor to consider while adapting a combination. For example, a user may want to avoid having a display change, or a user may want to avoid moving to use a different microphone. On the other hand, moving a MPEG decoder from one computer to another may not bother the user much. Changes to some devices may cause more inconvenience to the user than changes to others. In particular, devices that directly interact with the user may present a higher potential for inconvenience. Further, the extent of the inconvenience may depend on the kind of task being performed. For example, when watching a movie, the inconvenience associated with changing the display device is probably more severe than the inconvenience of changing the sound device.

In one embodiment of the present invention, a computed penalty score, or aggregation difference penalty, is computed that quantifies the amount of inconvenience that a user has to incur. In a prototype implementation, the formula for computing the aggregation difference penalty is as follows:

$$ADS(A_{new}, A_{old}) = \sum_{i=1}^{d} b_i(D_{new,i}, D_{old,i}) * DDP_i,$$

where the sum is taken over all of the devices that have non-zero penalties, $b_i$ equals zero if $D_{new,i}$ and $D_{old,i}$ are the same device and one otherwise, and $DDP_i$ is the penalty score for switching the ith device type. The sum of all $DDP_i$ scores is calibrated to add to 100. This difference penalty captures the inconvenience that the user has to incur, should the change in devices occur. Notice that there may be applications in which the user may like to minimize the amount of change at the expense of quality.

In other applications, a user may prefer better quality at the expense of change. Thus, one embodiment of the present invention allows a user to specify trade-offs between quality and change. One embodiment provides a re-combination mechanism that considers a user's tolerance for changing the devices that are included in the a selected combination by using policies that specify varying trade-offs between distraction and combination quality. These policies are also declarative and can be selected by the user, or they can be selected automatically by the system based on the context. They are applied when an event occurs raising the possibility of a change. A user's tolerance for change may be represented by weights for distraction penalties and combination quality.

Returning now to FIG. 2, once the scores for each of the functionally responsive combinations have been calculated, the combinations are ranked to provide an indication of the relative performance of each combination. Ranking information is displayed in the form of an ordered list on user interface 108.

In a step 218, the user may select a particular combination according to the score of the combination. A device can include laptop computers, PDA'S, flat panel monitor's, etc., that provide a functionality that can be combined with the functionality of other devices from an ensemble of available devices. Every device has an associated representative process that is responsible for communicating information, e.g., such as the device's availability and functionality, and possibly other properties. This representative process may execute on the device itself, or on some other device.

Each combination includes a subset of devices from an ensemble of available devices that are able to be combined together to perform a user requested task. For example, a projector, audio ear-buds, and a personal digital assistant (PDA) may be combined to form a combination that is suitable for playing an mpeg movie.

An ensemble is a collection of devices that are available to and can be controlled by a user. These devices may be owned by the user or borrowed temporarily, and can be considered "available" for the purpose of performing a users task(s).

A distraction is an inconvenience caused to a user by modifying one or more of the devices which are included in a combination. For example, a user may experience distraction if a display device moves from a laptop to a wall projector, even if the quality of the display is improved. An inconvenience of this type may distract the user from the users current task. According to the present invention, a metric of user distraction is used to compare functionally responsive combinations when performing reconfigurations. E.g., when one or more of the devices in a existing combination are replaced with other device from an ensemble. Such a comparison includes specifying and quantifying the metric of distraction to allow the user to specify trade-offs between the amount of distraction the user is willing to tolerate and the quality of the combination that the user desires.

The stability metric quantifies how well a combination will be able to perform a user task to completion. That is, stability is a probability that a combination will be able to perform a task for a desired amount of time. For example, if a device's battery will be exhausted before a certain task is completed, then any combination that uses that device will have lower stability than a combination that uses another device with a longer battery life. Similarly, a combination will have relatively low stability if it includes a borrowed device that is likely to become unavailable before the user requested task is completed.

Context information may be used to characterize an ensemble's environment. Examples include the user requested task, the devices included in an ensemble, the users location, and the time of day.

A policy is a group of numerical weights having an associated high-level description, wherein the weights encode a users preferences for various device attributes, types of devices, and types of tasks. E.g., "Prefer a Large Screen and Prefer a Flat Screen", which encodes a preference that gives a high weight to display devices that have a large, flat screen. Policies are used to capture user preferences about devices and combinations as high-level abstractions and so allow the user to focus on the desired experience rather than understand the details of the devices and the system. Policies can be suggested to the user based on context and a user's combination history. This allows combinations to be similar and predictive across different environments, and thus reduce the level of support required from the user.

Although the present invention has been described in terms of the presently preferred embodiments, it is to be understood that the disclosure is not to be interpreted as limiting. Various alterations and modifications will no doubt become apparent to the skilled in the art after having read the above disclosure. Accordingly, it is intended that the appended claims be interpreted as covering all alterations and modifications as fall within the true spirit and scope of the invention

What is claimed is:

1. A method, comprising:
   receiving a user request into a coordinating device, wherein the user request requests a task to be performed by one or more of a plurality of electronic devices available ad-hoc;
   processing at said coordinating device a service description information for each of the one or more of the plurality of electronic devices available ad-hoc and identify functionally responsive combinations of electronic devices capable of servicing said user request;
   calculating a score for each of the functionally responsive combinations, said calculating using user preference information;
   configuring said available electronic devices of the functionally responsive combinations into an ad-hoc combination based on said calculated scores; and
   servicing said user request with said ad-hoc combination, wherein calculating the score for each of the functionally responsive combinations is calculated as:

$$AS(A, AP) = \sum_{i=1}^{n} sw_i(D, AP) * e(D_i) * DS_i(D, DP_i)$$

where:
A is a particular functionally responsive combination;
AP is a combination-level policy, wherein the combination-level policy indicates how the electronic devices are scored relative to each other;
AS is a calculated score for the particular functionally responsive combination;
n is a number of electronic devices that are included in said particular combination, wherein n is greater than one;
$sw_i$ is a weight assigned to each device of type i according to said combination-level policy AP;
DP is a device scoring policy based on the user preference information;
$DS_i$ is an unweighted device score for each device D; and
$e(D_i)$ is a percentage indicating availability of said device $D_i$, wherein the percentage is based on a status of said device $D_i$.

2. The method of claim 1, further comprising:
building said service description information for a respective device from a service identifier, which is representative of a function which said respective device is able to provide;
at least one required service identifier, each at least one required service identifier being representative of services that said respective device requires to provide said function;
device attribute information, which is representative of characteristics of said device; and
attribute values, which are representative of a relative score for a respective device attribute.

3. The method of claim 2, further comprising:
including in said identification of functionally responsive combinations identifying devices having a service identifier which corresponds to said user request and thereafter combines each of said identified devices with other devices, each of the other devices having a service identifier which matches a required service identifier of a respective identified device.

4. The method of claim 3, further comprising:
computing a separate unweighted device score DS for each device included in a functionally responsive combination, such that for each device said computing uses said device's attribute values and weighs said attribute values according to said user preference information.

5. The method of claim 4, further comprising:
weighting said attributes values with a device-level policy comprising a vector of weights which encodes said user preference information for said device attributes.

6. The method of claim 3, further comprising:
selecting a device-level policy from a predefined group of device-level policies.

7. The method of claim 6, further comprising:
computing said unweighted device score DS as:

$$DS(D, DP) = \sum_{i=1}^{d} aw_i(DP) * D(v_i)$$

where:
DS is said device score for device D according to a device-level policy DP;
d is said number of attributes for said device;
$aw_i(DP)$ is said weight of attribute i according to policy DP; and
$D(v_i)$ is said device's value $(v_i)$ for attribute i.

8. The method of claim 4, further comprising:
using said device scores for each device in a functionally responsive combination such that each device score is weighting according to said user preference information.

9. The method of claim 8, further comprising:
using a parameter which is indicative of availability of said device.

10. The method of claim 9, further comprising:
encoding a vector of weights for said user preference information for said each device.

11. A programmable apparatus for selecting a combination of electronic devices from a plurality of available electronic devices for performing a user request, each electronic device having service description information associated therewith, said apparatus comprising:
user interface means for receiving a user request;
a processor for processing said service description information associated with said available electronic devices for identifying functionally responsive combinations of electronic devices, each of the functionally responsive combinations being capable of servicing said user request; and for calculating a score for each of the functionally responsive combinations, said calculating using user preference information; for selecting one of said functionally responsive combinations based on said calculated scores; and for servicing the user request with the selected one of said functionally responsive combinations,
wherein calculating the score for each functionally responsive combination is calculated as:

$$AS(A, AP) = \sum_{i=1}^{n} sw_i(D, AP) * e(D_i) * DS_i(D, DP_i)$$

where:
A is a particular functionally responsive combination;
AP is a combination-level policy, wherein the combination-level policy indicates how the electronic devices are scored relative to each other;
AS is a calculated score for the particular functionally responsive combination;
n is a number of devices that are included in said particular combination, wherein n is greater than one;
$sw_i$ is a weight assigned to each device of type i according to said combination-level policy AP;
DP is a device scoring policy based on the user preference information;
$DS_i$ is an unweighted device score for each device D; and
$e(D_i)$ is a percentage indicating availability of said device $D_i$, wherein the percentage is based on a status of said device $D_i$.

12. The apparatus according to claim 11 wherein said service description information for a respective device comprises:

a service identifier, which is representative of a function which said device is able to provide;

required service identifier, which is representative of services that said device requires to provide said function;

device attribute information, which is representative of characteristics of said device; and attribute values, which are representative of a relative score for a respective device attribute.

13. A non-transitory computer data storage media storing computer software instructions to make a programmable device execute the following steps:

receiving a user request, wherein the user request requests a task to be performed by one or more of a plurality of available devices;

processing service description information for each of the one or more of the plurality of available devices and identify functionally responsive combinations of devices, each functionally responsive combination being capable of servicing said user request;

calculating a score for each of the functionally responsive combinations, said calculating using user preference information;

selecting one of said functionally responsive combinations based on said calculated scores; and servicing the user request with the selected one of said functionally responsive combinations, wherein calculating the score for each of the functionally responsive combinations is calculated as:

$$AS(A, AP) = \sum_{i=1}^{n} sw_i(D, AP) * e(D_i) * DS_i(D, DP_i)$$

where:

A is a particular functionally responsive combination;

AP is a combination-level policy, wherein the combination-level policy indicates how the electronic devices are scored relative to each other;

AS is a calculated score for the particular functionally responsive combination;

n is a number of devices that are included in said particular combination, wherein n is greater than one;

$sw_i$ is a weight assigned to each device of type i according to said combination-level policy AP;

DP is a device scoring policy based on the user preference information;

$DS_i$, is an unweighted device score for each device D; and $e(D_i)$ is a percentage indicating availability of said device $D_i$, wherein the percentage is based on a status of said device $D_i$.

14. Computer data storage media according to claim 13 wherein said computer software instructions comprise run time software modules and configuration software modules, said run time modules comprising:

a user interface module for receiving said user request;

a service registration and look up module for registering said service description information for said available devices;

an aggregator module for identifying said functionally responsive combinations of devices;

an evaluator module for calculating said scores for each of said functionally responsive combinations; and wherein said configuration modules include:

a service repository for storing said service description information for each registered device;

a policy repository for storing policy information; and user preference history files for storing historical user preference and contextual information.

* * * * *

UNITED STATES PATENT AND TRADEMARK OFFICE
CERTIFICATE OF CORRECTION

| | | |
|---|---|---|
| PATENT NO. | : 7,826,907 B2 | Page 1 of 1 |
| APPLICATION NO. | : 10/632403 | |
| DATED | : November 2, 2010 | |
| INVENTOR(S) | : Rajnish Kumar et al. | |

It is certified that error appears in the above-identified patent and that said Letters Patent is hereby corrected as shown below:

In column 16, line 15, in Claim 13, delete "$DS_i$," and insert -- $DS_i$ --, therefor.

Signed and Sealed this

Twentieth Day of December, 2011

David J. Kappos
*Director of the United States Patent and Trademark Office*